Feb. 17, 1953  N. E. KLEIN  2,628,502
MAGNETIC ORIENTATION
Filed May 11, 1944  3 Sheets-Sheet 1

Inventor
NORMAN E. KLEIN
By
Attorney

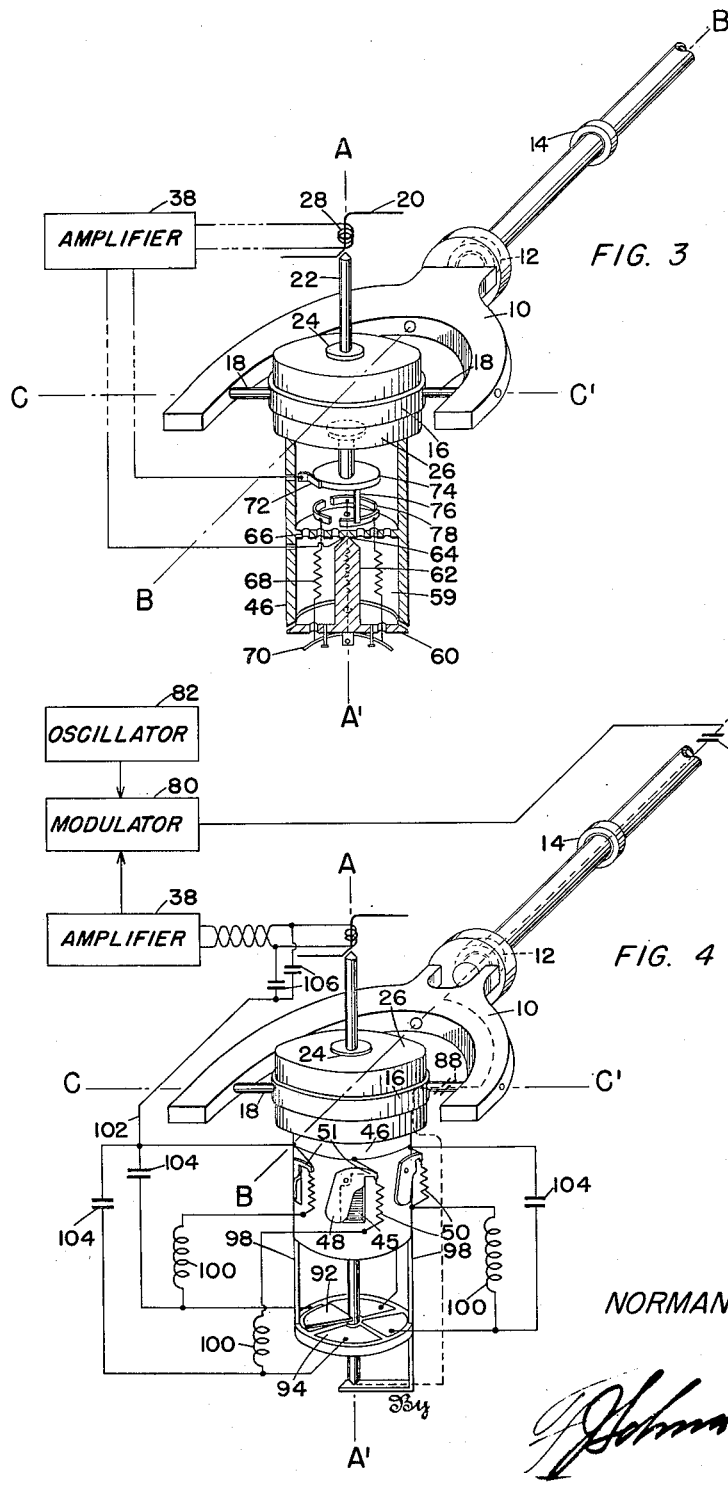

Patented Feb. 17, 1953

2,628,502

UNITED STATES PATENT OFFICE 2,628,502

MAGNETIC ORIENTATION

Norman E. Klein, Garden City, N. Y., assignor to the United States of America as represented by the Secretary of the Navy Application May 11, 1944, Serial No. 535,160

3 Claims. (Cl. 74—5.43)

This invention relates to orientation systems and more particularly to a magnetic orientation system adapted to maintain an axis substantially parallel to a relatively uniform magnetic field, such as the earth's magnetic field.

In the past, several orientation systems have been devised for maintaining a magnetometer element substantially parallel to the earth's magnetic field irrespective of movements of the base upon which the magnetometer element is mounted. In such systems, it is usual to provide the magnetometer element with a gimbal-type suspension, and to provide suitable control devices and driving means whereby appropriate corrections in the orientation of the magnetometer element may be made by compensating movements of the gimbals. These systems suffer from disadvantages in that they require entirely separate control and drive means for each of the two gimbal motions. This involves duplication of control and drive means and, particularly in portable magnetometers, results in substantial increases in the weight of the unit and in the power required for its operation.

It is, therefore, an object of the present invention to provide an orientation system in which a single control means, operating in conjunction with suitable drive means, may be employed to effect all necessary adjustments in the orientation of the axis which is to be maintained parallel to a uniform magnetic field.

It is another object of the invention to provide an orientation system for a portable magnetometer which is substantially lighter than previous systems, and which requires considerably less power for its operation.

In view of the above objects, the present invention provides in one aspect an orientation system for maintaining an axis substantially parallel to a relatively uniform magnetic field, the system comprising a coil in axial alignment with the axis, a magnetic strip member extending through the coil and arranged for rotation with at least a portion of the strip member rotating in a plane perpendicular to the axis, and means for utilizing the voltage induced in the coil due to the magnetic field when the axis departs from parallelism with the magnetic field to restore the axis substantially to parallelism with the field.

While the improved orientation system hereinafter disclosed is adapted for use in conjunction with any magnetometer, its operation is particularly advantageous in conjunction with the unbalanced magnetometer described in copending application Serial No. 516,612, filed January 1, 1944, by Otto H. Schmitt, now Patent No. 2,560,132.

The above and other features of the invention will be described in detail in the following specification and pointed out in the appended claims.

In the drawings,

Fig. 3 is a schematic view partly in section of another embodiment of my invention and illustrates a modification of the device of Fig. 2;

Fig. 4 is a schematic view of still another embodiment of my invention illustrating alternative means whereby the voltage induced in the coil may be utilized for control purposes.

Figure 1:
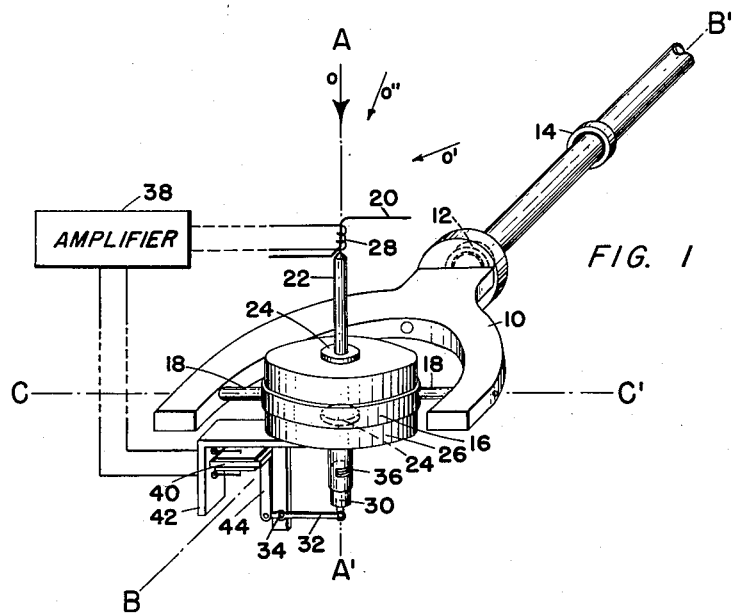
Fig. 1 is a schematic view of an orientation system according to my invention.

In Fig. 1, the axis to be maintained in parallelism with the earth's magnetic field is represented by the line A—A', and a suitable gimbal system is provided for effecting changes in the orientation of this axis. Conveniently and for purposes of illustration, this system comprises outer fork 10, mounted for rotation about axis B—B', in bearings 12 and 14, and inner ring 16, mounted for rotation about axis C—C' on shafts 18, journaled in outer gimbal fork 10. Bearings 12 and 14 are supported by any suitable base (not shown). Axis A—A' extends perpendicularly to the plane of inner ring 16, and may thus be oriented in any desired direction. Control of the orientation of axis A—A' is by means of a magnetic pickup and drive mechanism to be described below.

The magnetic pickup includes a magnetic strip member 20 mounted for rotation about axis A—A'. Strip member 20 is shown in Fig. 1 as having a central portion extending along axis A—A' and two arms extending at right angles to this axis. It is to be understood, however, that the strip member may have any desired shape provided it is mounted for rotation about axis A—A', and so long as at least a portion of the strip member extends perpendicularly to this axis. The strip member may be formed of magnetic material having high permeability such as Permalloy or mu-metal. Other materials having comparable characteristics may also be used.

For rotating strip member 20 about axis A—A', an air-driven motor, such as is commonly used in gyro compasses and similar devices, may conveniently be used. Such a motor comprises essentially a turbine wheel 107 and suitable nozzles 108 for directing a stream or streams of air against buckets 109 of the wheel. In the present device, the wheel is mounted on shaft 22 which rotates in bearings 24 mounted is housing 26 which in turn is supported by inner ring 16, and is arranged for rotation about axis A—A'. Air for the operation of the turbine wheel may be conducted thereto by any suitable means. In conventional systems, however, gimbal fork 10 and shafts 18 are made hollow to provide a continuous air duct from an external supply to the turbine. Conveniently shaft 22, on which the air wheel is mounted, is allowed to extend through the top of case 26 and magnetic strip member 20 is mounted thereon.

Since a body at rest tends to remain at rest until disturbed by an external force, it is advantageous to give the unit supported by the gimbal system a high inertial moment whereby the system is given a long period which tends to overcome high-frequency movements of the base on which the gimbal system is mounted. In order to achieve a suitably high inertial moment without undesirably increasing the total mass of the system, a relatively light flywheel 107 is mounted on shaft 22 with the air motor previously described. Conveniently, this flywheel may be provided with buckets 109, thereby making it and the air motor a single unit. If now, shaft 22 and the associated flywheel are given a high angular velocity, as for example 15,000 to 25,000 R. P. M., the gyroscopic action of the flywheel will give the entire system supported by ring 16 a relatively high inertial moment without seriously increasing the total mass thereof.

Let it now be assumed that the direction of the relatively uniform magnetic field, with which the axis A—A' is to be maintained in parallelism, coincides with that axis as shown in Fig. 1, the direction of the field being indicated by the arrow O superimposed on the axis. It will be seen that as strip member 20 revolves, its arms rotate in a plane exactly perpendicular to the magnetic field. Consequently, there is no over-all change in flux through the central portion of the strip member. It will also appear that this condition will exist whether or not the central portion of the strip member is, as shown in Fig. 1, coincident with axis A—A', so long as the axis of rotation of the strip member and axis A—A' coincide.

If now, axis A—A' is assumed to be out of parallelism with the uniform magnetic field as now indicated by arrow O' in Fig. 1, the two arms of the strip member no longer rotate in a plane perpendicular to the direction of the field. There is, accordingly, a component of flux along each of the arms of the strip member, the magnitude of such flux being dependent upon the sine of the angle between axis A—A' and the direction of the magnetic field. The magnitude and polarity of the flux at any instant depend also upon the position of the strip member in its rotational cycle or, in other words, upon the mechanical phase of the strip member.

In order to utilize the effect above described, a pickup coil 28 is provided. This coil is mounted on supports 110 in axial alignment with axis A—A' and a portion of strip member 20 extends therethrough. If axis A—A' is in parallelism with the uniform magnetic field, there is no change in flux through the portion of the strip member extending through the coil and, therefore, no voltage appears across the coil. If, on the other hand, axis A—A' is not in parallelism with the uniform magnetic field, there is a change in flux in the strip member extending through the coil and a voltage is induced in the pickup coil. Due to the rotation of strip member 20, this voltage is simple harmonic in nature, and its amplitude depends upon how far axis A—A' deviates from parallelism with the direction of the uniform magnetic field.

The phase of the voltage appearing across the coil depends upon the direction in which axis A—A' deviates from parallelism with the direction of the uniform magnetic field. This is due to the fact that the maximum change in flux, in the portion of the strip member extending through the pickup coil, occurs at various times during the rotational cycle of the strip member depending upon the direction of disorientation. Thus, assuming that the disorientation is that indicated between axis A—A' and arrow O', lying in the plane of the paper, the output voltage across the coil will have a certain value when the strip member is in the position in its rotational cycle shown in Fig. 1. If now, without changing the position of the strip member in its rotational cycle, or the magnitude of disorientation, the disorientation is assumed to be that between axis A—A' and arrow O'' not in the plane of the paper, the output voltage across the coil will have some other value, the change in output voltage under these conditions being due to a change in phase of the induced voltage.

As pointed out above, the phase of the voltage appearing across coil 28 in relation to the mechanical phase of the magnetic strip member is a measure of the direction of the deviation of axis A—A' from parallelism with the uniform magnetic field, while the amplitude of the induced voltage is a measure of the magnitude of the deviation. This information may be applied through a variety of control mechanisms and driving means to restore the axis to parallelism with the field. Several such systems are illustrated and described herein, although it is to be understood that the systems are intended as illustrations only, and that other means may be used for the same purpose. In each of the systems herein described, the voltage generated in coil 28 is utilized to control the direction and amount of discharge of a blast of air, the reaction of the air blast being used to produce suitable restoring torques about the two gimbal axes. Conveniently, the exhaust air stream from the gyro wheel may be used for this purpose.

In the arrangement shown schematically in Fig. 1, the lower portion of shaft 22 is hollow and extends for some distance beyond bearing 24. Means are provided within gyro housing 26 for conducting the exhaust air from the gyro motor into this hollow shaft. This may take the form of ports 111 in the hollow portion of the shaft 22 within the housing 26. A piston 30 supported by a link 32, pivotally mounted at 34, closes the open end of shaft 22. An orifice 36 is formed in this shaft extending 120 to 180 degrees about its circumference. This orifice is so positioned in the shaft that piston 30 ordinarily obstructs about one half the exhaust opening afforded thereby. It will be understood that, as the shaft revolves, air is exhausted continuously through the orifice so that, at the conclusion of one revolution, the sum of the reactionary forces acting on the shaft is zero, and no torques about the gimbal axes are exerted thereby. If, however, piston 30 is moved up and down during one revolution of gyro shaft 22, it will be apparent that, depending upon the motion of the piston, more air will be exhausted in one direction than in another. The sum of the forces acting on the shaft during one revolution will, therefore, no longer be zero and a torque will be exerted about one or both of the gimbal axes. The torque thus exerted, during one revolution of the shaft, is relatively slight and will have little effect because of the high inertial moment of the system supported by the gimbal suspension. If the modulation of exhaust stream by piston 30 as described above is continued throughout a relatively large number of revolutions of gyro shaft 22, however, the relatively slight torques produced during each revolution will be integrated to cause an appreciable orienting torque.

In order to move piston 30 properly to modulate the air stream through orifice 36 for the purpose of generating compensating torques in response to voltages generated by coil 28, when the axis A—A' deviates from parallelism with the magnetic field, the following means are provided. The voltage output of coil 28 is introduced to the input of a medium-gain audio-frequency amplifier 38. This amplifier may be of any suitable type but must have a very low incremental phase shift in the frequency range of the voltages generated in the pickup coil 28, this range being determined by the angular velocity of strip member 20. The output of amplifier 38 is fed to piezo crystal unit 40, one end of the crystal of which is rigidly supported by means of bracket 42 on housing 26. Motion due to deformations of the piezo crystal due to changes in the applied electrostatic field are transmitted to piston 30 through linkage indicated schematically at 44 and link 32.

In the operation of this device, an alternating voltage is generated in pickup coil 28 whenever the axis A—A' deviates from parallelism with the uniform magnetic field, the amplitude and phase of this voltage depending upon the magnitude and direction of such deviation. This voltage is amplified in amplifier 38 and applied to drive piezo crystal 40 which is linked to piston 30. As the voltage induced in the coil and applied to the crystal reaches a maximum, maximum displacement of the piston occurs resulting in maximum discharge of exhaust air from the gyro wheel. Similarly the amount of air discharged in any direction from orifice 36, varies with the amplitude and phase of the induced voltage. Thus, after a number of revolutions of shaft 22, the unbalanced air discharge during each revolution will result in the generation of torques about one or both of gimbal axes B—B' and C—C' tending to restore axis A—A' to parallelism with the uniform magnetic field. It is to be understood that the mechanical displacement between magnetic strip member 20 and orifice 36 in shaft 22 is such that the maximum torque will be generated in the proper direction to cause exact compensation for disorientation, taking into account among other factors the absolute phase shift in amplifier 38.

The system above described has the additional advantage that no preliminary mechanical, magnetic or electrical adjustments are required in its operation. The axis A—A' automatically moves into parallelism with the uniform magnetic field as soon as rotation of the magnetic strip begins, and thus initial manually controlled adjustments in orientation are not necessary.

Figure 2:
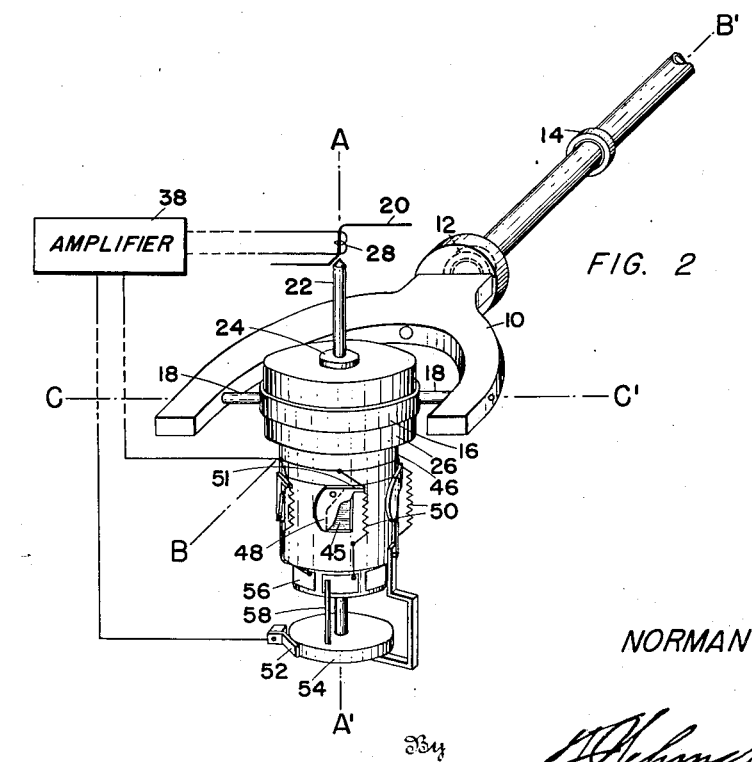
Fig. 2 is a schematic view of an embodiment of my invention in which an alternative drive means is used.
Figure 5:
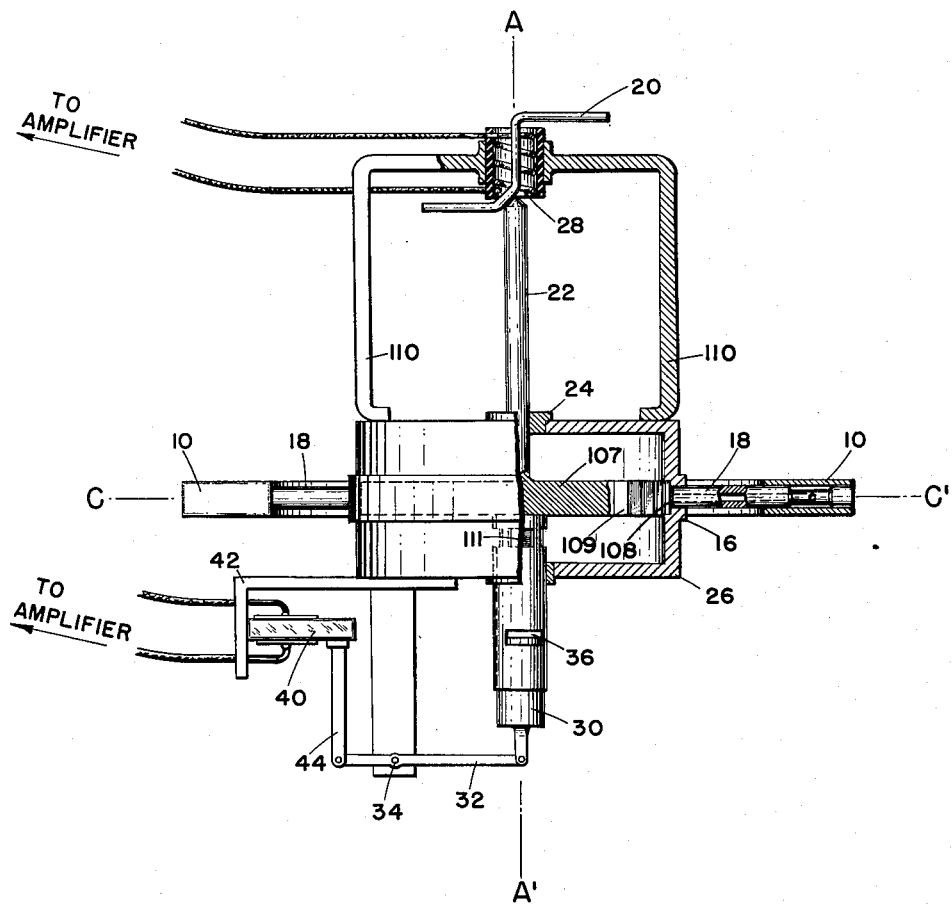
Fig. 5 is a sectional view of the head of the device shown in Fig. 1.

The device illustrated in Fig. 2 utilizes another method by which the voltage generated in coil 28 may be employed to effect compensation for disorientation between axis A—A' and the uniform magnetic field. As in the device described above and illustrated in Fig. 1, restoring torques are generated by means of exhaust air from the motor operating the gyro wheel. In this case, however, the quadrate system of exhaust ports, commonly used in gyro-horizon instruments, is employed. Thus, ports 45 are formed in an extension 46 of gyro housing 26, and the exhaust of air therethrough is controlled by means of vanes 48 pivoted on shafts normal to the walls of housing extension 46. It should be noted that only three of the four exhaust ports and associated mechanisms are shown in the drawing, but that the remaining port and mechanism are identical in all respects to those shown. Springs (not shown) are provided normally to maintain the vanes at their equilibrium position in respect to the ports, this position being one as shown in Fig. 2, in which the port is partially uncovered. When the four vanes are thus positioned, the four port openings are equal and, therefore, the reactionary forces due to exhaust air are in exact balance. Under these conditions, it is obvious that no torques will be exerted about either of the gimbal axes.

Control of the four vanes for the purpose of generating restoring torques when disorientation between axis A—A' and the magnetic field occurs, is effected by use of hot-wire filaments which expand when heated by currents flowing through them. The currents through the filaments are varied in accordance with the voltage induced in coil 28 when disorientation occurs. Accordingly, there is associated with each of the vanes 48, a fine resistance wire indicated schematically in Fig. 2 at 50. In each case, this wire is stretched between arm 51 on vane 48 and a fixed point on housing extension 46, a suitable adjustment (not shown) being provided for altering the tension of the wire. This tension is normally so adjusted that with no current passing through the wire, the action of the return spring on vane 48 is just balanced. If a current is allowed to flow through the wire, $I^2R$ heating occurs causing expansion thereof which in turn allows vane 48 to pivot and open the exhaust port 45 with which it is associated. Since four exhaust ports are provided, it will appear that, through the combination of one or more exhaust adjustments, restoring torques may be generated about one or both of the gimbal axes.

In the operation of the hot-wire-actuated valves, the output from coil 28 is amplified in an amplifier 38 which must have low incremental phase shift as in the case of the amplifier described in connection with the device in Fig. 1. Output of the amplifier is fed through contact 52 to slip ring 54 adjacent to housing extension 46 on shaft 22. A four-bar commutator is formed on housing extension 46, one bar 56 of which is connected to each of resistance wires 50. A rotary brush 58, mounted on slip ring 54, travels on this commutator and completes successively circuits carrying current to the several resistance wires, the circuit return being made common to all of these resistance wires.

In the operation of this arrangement, no current reaches resistance wires 50 so long as the axis A—A' remains in parallelism with the uniform magnetic field. When disorientation occurs, the amplified output of coil 28 is fed through slip ring 54 from which it is fed to one of the resistance wires depending upon which commutator bar 56 is at that moment in contact with rotary brush 58. Since the output of magnetic strip member 20 reaches a positive maximum once each revolution when disorientation exists, unequal currents will flow in the resistance wires during each revolution of the strip member. While the current pulses through resistance wires 50 each revolution are very small, the cumulative effect of a number of such pulses is such as to cause $I^2R$ heating and consequently expansion of one or more of wires 50 depending upon the direction of disorientation. As a result, some of vanes 48 will be moved more than others, causing an unbalance in the reactionary forces due to exhaust air from the gyro motor. This unbalance of forces causes compensating movements of the gimbal suspension to return axis A—A' to parallelism with the magnetic field.

As in the case of the device shown in Fig. 1, the magnetic strip member 20 and brush 58 must be given the proper angular displacement on shaft 26 to insure that the restoring torques will be exerted in the proper amounts about the gimbal axes.

Although there has been described a control device using a system of quadrate exhaust ports, it is to be understood that the same control system may be applied to systems using any number of exhaust ports greater than two.

Fig. 3 illustrates a device in which a second method is used to apply the hot-wire valving principle to control of the reactionary forces of exhaust air from the gyro drive. In this case, housing extension 46 is provided with a cylindrical chamber 59 having an open lower end, and ducts are provided to carry the exhaust air into this chamber. The open end of this chamber is partially obscured by means of a disc 60 mounted on rod 62, pivotally supported at 64 on a web 66 within the chamber. Resistance-wire filaments 68 are secured to web 66 and extend through disc 60 to tensioning springs 70 on the reverse side thereof. As in the case of the device shown in Fig. 2, the amplified output of pickup coil 28 is fed through contact 72 to a slip ring 74 on shaft 22. Brush 76, mounted on slip ring 72, carries the current to the three segments 78 of a commutator supported by web 66. One of resistance wires 68 is associated with each of the three segments, the common return circuit being through shaft 62 to framework 66 and thence to amplifier 38.

Operation of this device is in many respects similar to that of the device disclosed in Fig. 2 and described above. When axis A—A' and the magnetic field are parallel, pickup coil 28 has no output and no current flows through the three resistance wires. Under these conditions, disc 60 is positioned substantially as shown in Fig. 3, providing a 360-degree exhaust opening at the bottom of housing extension 46. If, however, disorientation of axis A—A' in respect to the magnetic field occurs, the amplified output of magnetic strip member 20 causes a current pulse in one or more of resistance wires 68 during each revolution of strip member 20. As in the case of the device of Fig. 2, the phase and amplitude of the induced voltage in coil 28, in respect to the mechanical phase of strip member 20, determines the amplitudes of the currents in the several resistance wires. After repetitious current pulses during several revolutions of shaft 22, the wires through which the current flows expand due to $I^2R$ heating and allow the springs 70, associated with the remaining wire or wires, to tip disc 60 about its pivotal support. This effectively reduces the exhaust opening on one side of housing extension 46 and, at the same time, enlarges the opening on the opposite side of the housing. The unbalanced exhaust through chamber 59 from the gyro motor results in a restoring torque which tends to reorient axis A—A' in respect to the magnetic field. As in the previously described devices, brush 76 must be given the proper angular displacement in relation to strip member 20 to insure that the restoring torques will be applied in the proper manner to reorient axis A—A'

In the device of Fig. 4, alternative means are provided for carrying current to resistance wires 50 of the device in Fig. 2, such means being of advantage where it is necessary to eliminate frictional drag in the commutator mechanisms described in connection with the devices of Figs. 2 and 3. In this device, the amplified output of coil 28 due to disorientation of axis A—A' is fed to a modulator and used to modulate the output of a radio-frequency oscillator. The modulated radio-frequency carrier is fed through a series of air coupling capacitors to hot-wire filaments, the coupling capacitors making possible transmission of the signal from modulator to gimbal fork 10, then to gimbal ring 16 and thence to the valving mechanism without the necessity of flexible pig-tail leads.

As shown schematically in Fig. 4, the output of amplifier 38 is fed to modulator 80 and modulates the output of radio-frequency oscillator 82. Output of the modulator is fed to gimbal fork 10 through a parallel plate air capacitor 86 shown schematically in the drawing. Preferably, this capacitor is arranged with parallel circular plates mounted with their axes in alignment and also in alignment with gimbal axis B—B', one plate being secured to the base on which bearing 14 is mounted, and the other to fork 10.

Transmission of the modulator output from fork 10 to inner ring 16 is accomplished by means of a second coupling capacitor 88 similar to capacitor 86 in all respects. One plate of capacitor 88 is mounted on fork 10 and the other is mounted on ring 16, the axes of the two plates being in alignment and also in alignment with gimbal axis C—C'.

In order to reduce friction due to slip rings and commutators of the type using a contact brush, a capacitance commutator is provided. Thus, the modulated carrier is transmitted from inner ring 16 through contact 90 at the end of shaft 22 to a capacitor plate 92 mounted on shaft 22 for rotation in a plane normal thereto. Fixed capacitor plates 94 are mounted in a plane parallel to the rotational plane of plate 92 on support plate 96 which is suspended from housing extension 46 on rods 98. One fixed capacitor plate is provided for each of hot-wire filaments 50. Thus, in the quadrate valving arrangement of Fig. 4, four such plates are provided and rotating plate 92 takes the form of a 90-degree segment.

As in the control arrangements previously described, the magnitude of the current pulses in each of hot-wire filaments 50 due to disorientation between axis A—A' and the magnetic field is dependent upon the direction and magnitude of the disorientation.

Since the transmission line comprising capacitors 86, 88 and the capacitor formed by rotating plate 92 and one or more of fixed plates 94 is conveniently of high impedance to reduce the size of the required components and since the hot-wire filaments are essentially low-impedance devices, an impedance-matching circuit comprising in each case an inductor 100 in series with hot-wire filament 50 between fixed plate 94 and common return lead 102, and a capacitor 104 connected in parallel with the inductor-filament circuit is provided. Such circuits are shown schematically in Fig. 4 for the three hot-wire filaments 50 that are visible, and it is to be understood that a similar circuit is provided for the fourth filament which is not shown.

In order to reduce the number of flexible leads from the control mechanism to the electronic equipment, the leads from pickup coil 28 to amplifier 38 are used as the common lead to ground for the radio-frequency currents. For this purpose, common return lead 102 is coupled through capacitors 106 to both of the leads from coil 28.

It will be understood that any suitable oscillator and modulator may be used in connection with this device and that the frequency used may also be varied between wide limits. The following circuit constants are, therefore, given only by way of example. Thus, in the device of Fig. 4, oscillator 82 and modulator 80 may be combined through the use of a single pentode-type vacuum tube arranged to act both as a crystal-controlled oscillator and as a suppressor-grid modulator, a type 837 tube being suitable for this purpose. In one embodiment of the invention using this tube, the radio frequency chosen may be 5 megacycles. Under these conditions, each of coupling capacitors 86 and 88 may have a value of 60 micro-microfarads, while the capacitance between rotating plate 92 and any of fixed plates 94 may have the same magnitude. Resistance wires 50 may then have a resistance of 10 ohms each, while the impedance-matching components may then comprise inductor 100 with an inductance of 6.5 microhenrys and capacitor 104 with a capacitance of 170 micromicrofarads. Each of coupling capacitors 106, in the common return lead, may conveniently have a value of 0.1 microfarad.

Having thus described my invention, what I claim as new and desire to secure by Letters Patent of the United States is:

1. An orientation system for maintaining an axis substantially parallel to a relatively uniform magnetic field, comprising a coil in axial alignment with said axis, a magnetic strip member extending through said coil and arranged for rotation about said axis, with at least a laterally extending terminal portion of said strip member generating a figure of revolution, means for rotating said strip member about said axis, and means for utilizing the voltage induced in said coil when said axis departs from parallelism with said magnetic field to restore said axis substantially to parallelism with said magnetic field.

2. An orientation system for maintaining an axis substantially parallel to a relatively uniform magnetic field, comprising a coil in axial alignment with said axis, a magnetic strip member extending through said coil means for rotating said magnetic strip member about said axis with at least one end portion of said strip member extending in a plane normal to said axis, means utilizing the cyclical voltage induced in said coil by the cyclic change of flux in said strip member when said axis departs from parallelism with said magnetic field to restore said axis substantially to parallelism with said magnetic field, said rotating means including a flywheel for increasing the inertial moment of said means to increase the natural period thereof.

3. An orientation system for maintaining an axis substantially parallel to a relatively uniform magnetic field, comprising supporting means for said axis permitting rotation thereof about two orientation axes, a coil in axial alignment with said axis, a magnetic core extending through said coil and mounted for rotation about said axis with at least a portion of said core rotating in a plane normal to said axis, an air motor for rotating said core, and means responsive to the voltage induced in said coil when said axis departs from parallelism with said magnetic field for directing the exhaust from said air motor in such manner as to produce restoring torques about said orientation axes tending to return said axis substantially to its original position of parallelism with said magnetic field.

NORMAN E. KLEIN.

REFERENCES CITED

The following references are of record in the file of this patent:

UNITED STATES PATENTS

| Number | Name | Date |
|---|---|---|
| 2,027,393 | McCreary | Jan. 14, 1936 |
| 2,380,932 | Bates | Aug. 7, 1945 |
| 2,397,949 | Curry | Apr. 9, 1946 |